United States Patent
Ghaderi et al.

(10) Patent No.: US 12,299,997 B1
(45) Date of Patent: May 13, 2025

(54) MULTI-ATTENTION MACHINE LEARNING FOR OBJECT DETECTION AND CLASSIFICATION

(71) Applicant: Zoox, Inc., Foster City, CA (US)

(72) Inventors: Amir Ghaderi, San Jose, CA (US); Jonathan Tyler Dowdall, San Francisco, CA (US); Derek Xiang Ma, San Carlos, CA (US)

(73) Assignee: Zoox, Inc., Foster City, CA (US)

( * ) Notice: Subject to any disclaimer, the term of this patent is extended or adjusted under 35 U.S.C. 154(b) by 417 days.

(21) Appl. No.: 17/952,604

(22) Filed: Sep. 26, 2022

(51) Int. Cl.
| | | |
|---|---|---|
| *G06V 20/56* | (2022.01) | |
| *G01S 13/86* | (2006.01) | |
| *G01S 17/86* | (2020.01) | |
| *G05D 1/00* | (2024.01) | |
| *G06F 3/16* | (2006.01) | |
| *G06F 18/22* | (2023.01) | |
| *G06V 10/764* | (2022.01) | |

(52) U.S. Cl.
CPC .............. *G06V 20/56* (2022.01); *G01S 13/86* (2013.01); *G01S 17/86* (2020.01); *G05D 1/0212* (2013.01); *G06F 3/16* (2013.01); *G06F 18/22* (2023.01); *G06V 10/764* (2022.01); *G06V 2201/07* (2022.01)

(58) Field of Classification Search
CPC .. G06V 20/56; G06V 10/764; G06V 2201/07; G01S 13/86; G01S 17/86; G05D 1/0212; G06F 3/16; G06F 18/22
USPC ........................................................ 382/103
See application file for complete search history.

(56) References Cited

U.S. PATENT DOCUMENTS

| | | | |
|---|---|---|---|
| 10,983,514 B2 * | 4/2021 | Cella .................... | G06Q 10/04 |
| 11,682,272 B2 * | 6/2023 | Avadhanam ........... | G06N 3/045 |
| | | | 340/944 |
| 11,893,087 B2 * | 2/2024 | Yang ..................... | G06N 3/08 |
| 11,921,824 B1 * | 3/2024 | Hester .................... | G06N 3/045 |
| 12,007,728 B1 * | 6/2024 | Mohta .................... | G06N 3/045 |
| 2009/0322871 A1 * | 12/2009 | Ji .......................... | G06V 20/58 |
| | | | 348/115 |
| 2017/0024877 A1 * | 1/2017 | Versace ................. | G06F 18/253 |

(Continued)

FOREIGN PATENT DOCUMENTS

| | | | | |
|---|---|---|---|---|
| CN | 108983219 A | * | 12/2018 | .......... G01S 13/867 |
| CN | 112166304 A | * | 1/2021 | .......... G01S 13/865 |

(Continued)

*Primary Examiner* — Mahendra R Patel
(74) *Attorney, Agent, or Firm* — Lee & Hayes, P.C.

(57) ABSTRACT

Techniques for detecting, locating, and/or classifying objects based on multiple sensor data inputs received from different sensor modalities. The techniques may include receiving sensor data generated by different sensor modalities of a vehicle, the sensor data including at least first sensor data generated by a first sensor modality and second sensor data generated by a second sensor modality. In some examples, the sensor data may be input into a machine-learning pipeline. The machine-learning pipeline may be configured to determine locations of objects in an environment surrounding the vehicle based at least in part on a correlation, by the multi-attention component, of the first sensor data and the second sensor data. The techniques may also include receiving, from the machine-learning pipeline, an output indicating a location of an object in the environment.

20 Claims, 7 Drawing Sheets

(56) References Cited

U.S. PATENT DOCUMENTS

| | | | |
|---|---|---|---|
| 2020/0097604 A1* | 3/2020 | Lee | G06N 3/08 |
| 2021/0237761 A1* | 8/2021 | Das | G06T 7/248 |
| 2021/0255307 A1* | 8/2021 | Bongio | G01S 13/726 |
| 2021/0261167 A1* | 8/2021 | Kum | G06F 18/2413 |
| 2021/0286923 A1* | 9/2021 | Kristensen | G01S 7/412 |
| 2022/0032970 A1* | 2/2022 | Vadivelu | G06V 10/454 |
| 2022/0076082 A1* | 3/2022 | Braley | G06F 18/251 |
| 2022/0101020 A1* | 3/2022 | Evans | G06N 3/08 |
| 2022/0156939 A1* | 5/2022 | Homayounfar | G06V 10/945 |
| 2022/0191638 A1* | 6/2022 | Stengel | G06V 40/10 |
| 2022/0261590 A1* | 8/2022 | Brahma | G06V 20/56 |
| 2022/0274625 A1* | 9/2022 | Garimella | G06N 3/04 |
| 2022/0374723 A1* | 11/2022 | Blukis | G06V 10/82 |
| 2023/0045790 A1* | 2/2023 | Braun | G06N 3/0442 |
| 2023/0114556 A1* | 4/2023 | Ryoo | G06V 10/82 382/156 |
| 2023/0236313 A1* | 7/2023 | Cserna | G01S 7/4802 342/53 |
| 2023/0326215 A1* | 10/2023 | Yu | G06V 20/58 701/28 |

FOREIGN PATENT DOCUMENTS

| | | | | |
|---|---|---|---|---|
| WO | WO-2015143173 A2 * | 9/2015 | | G01S 13/86 |
| WO | WO-2021108215 A1 * | 6/2021 | | G01S 13/42 |
| WO | WO-2021183993 A1 * | 9/2021 | | G01S 13/867 |
| WO | WO-2021226027 A1 * | 11/2021 | | G01S 17/931 |

\* cited by examiner

MULTI-ATTENTION MACHINE LEARNING FOR OBJECT DETECTION AND CLASSIFICATION

BACKGROUND

Different modalities of sensors can be used in various applications for data generation. In some cases, different types of sensor modalities can be utilized, in combination, to determine different types of information associated with an environment. By utilizing different types of sensor modalities to determine information associated with the environment, a more-accurate representation of the environment can be determined. However, processing different types of sensor data in combination, and in a way that is useful, can be difficult. That is, processing different types of sensor data in combination such that sensor data from one sensor modality is used to improve detections made based on sensor data from another modality, and vice-versa, can be difficult.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
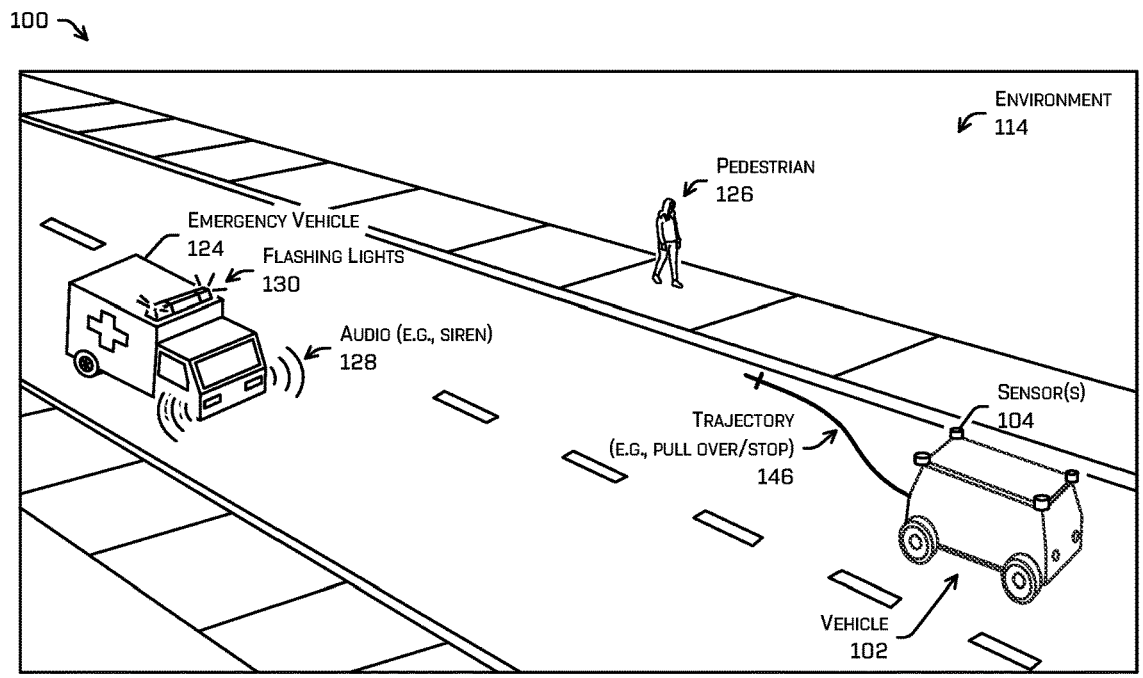
FIG. 1 illustrates an example process associated with using multi-attention machine-learning for vehicle perception.
Figure 1:
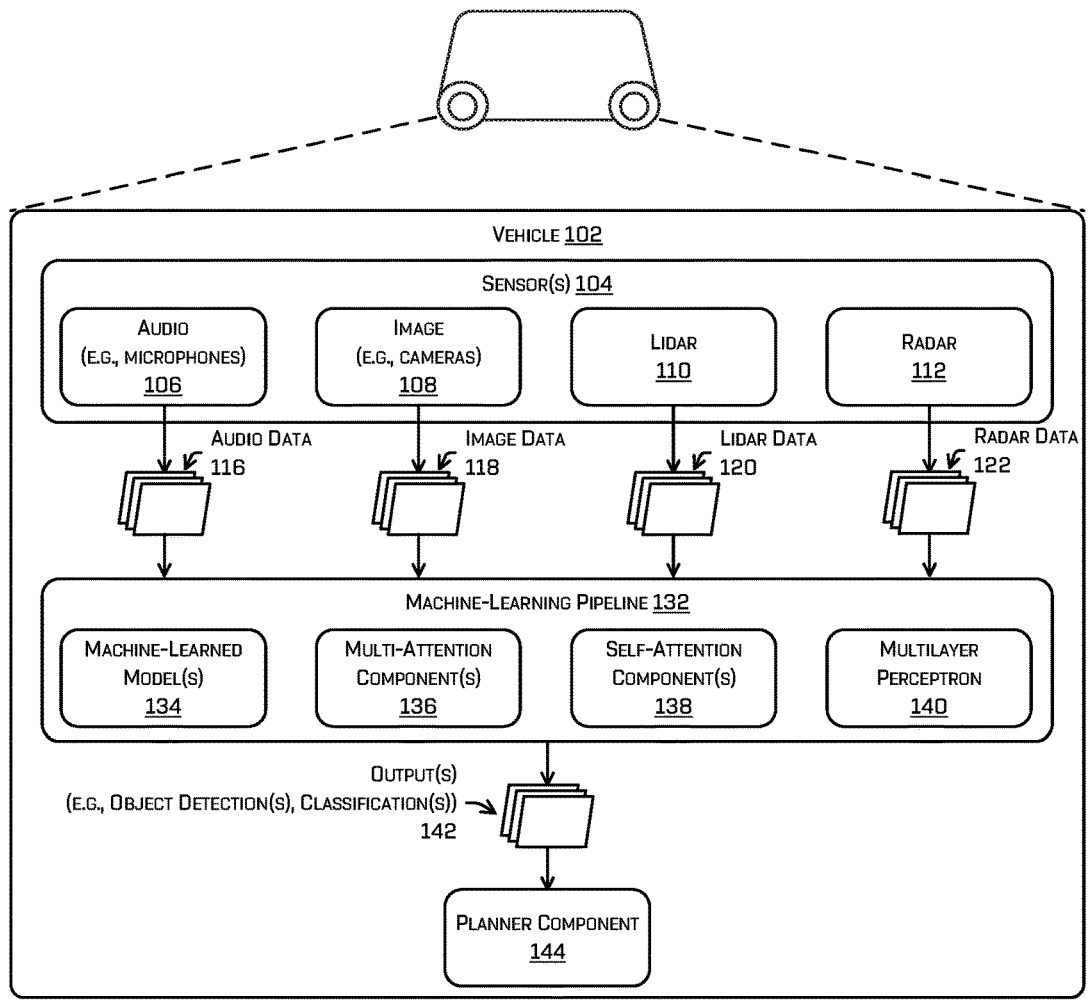

As noted above, by utilizing different types of sensor modalities to determine information associated with an environment, a more-accurate representation of the environment can be determined. However, processing different types of sensor data in combination, and in a way that is useful, can be difficult. That is, processing different types of sensor data in combination such that sensor data from one sensor modality is used to improve detections made in sensor data from another modality, and vice-versa, can be difficult.

Take, for example, an emergency vehicle (e.g., ambulance, police car, firetruck, etc.) that is operating in an environment. The emergency vehicle can include sirens and flashing lights that, when operating, assist in indicating the emergency vehicle's presence in the environment. For instance, sirens of the emergency vehicle, when in operation, may be heard and used to detect the emergency vehicle's presence and/or estimate a location of the emergency vehicle even if it is out of sight. Additionally, the flashing lights of the emergency vehicle may aid to indicate the emergency vehicle's presence and/or location independently from, or in addition to, the sirens.

In some examples, autonomous vehicles may be equipped with various sensors, such as microphones, cameras, radar, lidar, etc., to sense information associated with an environment. To continue the above example, an autonomous vehicle may include microphones capable of capturing audio data representing the siren, cameras capable of capturing images where emergency vehicle flashing lights can be seen, lidar to determine a distance to the emergency vehicle, if not occluded, and the like.

However, using captured sensor data from these various sensors in combination with each other in a way that improves autonomous vehicle perception is challenging. For instance, pipelines for processing sensor data are usually developed independently of one another. That is, a first pipeline may be developed for processing camera data, a second pipeline may be developed for processing lidar data, a third pipeline may be developed for processing audio data, and so forth, and then outputs from these different pipelines can be individually analyzed. In such pipelines, various techniques have been developed to fuse or otherwise combine sensor data together from multiple sensors of a same modality (e.g., multiple cameras). However, existing solutions do not look at different types of sensor data from different sensor modalities in combination to make inferences. Additionally, it is difficult to combine certain modalities of sensor data together to make inferences (e.g., it is more difficult to combine audio data with vision data or lidar data, as opposed to combining vision data with lidar data, for instance). Thus, there is no solution to process sensor data from different modalities in a way that sensor data from a first modality helps identify a feature in sensor data from a second modality.

This application is directed to technologies that, among other things, utilize machine-learning to detect, locate, and/or classify objects based on multiple sensor data inputs received from different sensor modalities (e.g., audio sensors, image sensors, lidar sensors, radar sensors, localization sensors, etc.) in such a way that extracted feature(s) from one modality of sensor help emphasize other feature(s) in another modality of sensor. For example, different sensor data may be received from different sensor modalities of a vehicle in an environment. For purposes of this illustration, let's assume that first sensor data and second sensor data from different sensor modalities are received, although more than two different types of sensor data can be received in various examples described herein. In some instances, the sensor data (e.g., the first sensor data and the second sensor data) may be synchronized and then input into a machine-learned model that includes a multi-attention component (e.g., cross attention). The multi-attention component of the machine-learned model may correlate various feature(s) between the different sensor data such that feature(s) in the first sensor data may draw attention to feature(s) in the second sensor data, and vice-versa. In other words, and for example, an extracted feature from the first sensor data (e.g., audio data) may be indicative of a presence of an object in the environment, and this extracted feature may draw the machine-learned model's attention to another feature in the second sensor data (e.g., vision, lidar, etc.) that is also indicative of the object's presence. As such, the machine-learned model may output object detections with higher confidence than it would otherwise output analyzing the sensor data separately. Additionally, the machine-learned model may determine classifications of objects with higher accuracy based at least in part on the multi-attention correlation. For instance, by performing a multi-attention correlation of audio data with image data and/or lidar data, a vehicle detected in the environment may be classified, with high confidence, as an emergency vehicle (e.g., based on sirens, flashing lights, etc.). Furthermore, the techniques disclosed herein may allow for features to be extracted and processed from sensor data that otherwise would be ignored, allowing for detection of objects that otherwise may not be detected, and computational overhead may be reduced by focusing on more important features in sensor data rather than other features that are less important.

By way of example, and not limitation, a method according to the technologies described herein may include techniques of receiving sensor data generated by different sensor modalities of a vehicle. In some examples, the vehicle may be operating in an environment, which may be a real environment or a simulated environment. In some examples, the sensor data may include any number of sensor data inputs from any number of sensor modalities. For instance, one or multiple audio data inputs may be received from one or more microphones associated with the vehicle, one or multiple image data inputs may be received from one or more cameras associated with the vehicle, one or multiple lidar data inputs may be received from one or more lidar sensors of the vehicle, etc. In examples, the sensors of the vehicle may include, but not be limited to, audio sensors (e.g., microphones), image sensors (e.g., cameras), lidar sensors, radar sensors, localization sensors (e.g., GPS), inertial sensors (e.g., IMU), and/or the like. In examples, the sensor data received from the different sensor modalities of the vehicle may include audio data and at least one of image data or lidar data.

In some examples, the sensor data received from the different sensor modalities of the vehicle may be input into a machine-learning pipeline. The machine-learning pipeline may, in some instances, include one or multiple machine-learned models, processes, sub-processes, and the like. In some examples, the machine-learned model(s) of the machine-learning pipeline may include machine-learned model(s) having multi-attention modules (e.g., self-attention modules) and machine-learned model(s) having multi-attention components (e.g., self-attention components). In some examples, the machine-learning pipeline may include one or more multilayer perceptron processes.

In some examples, the sensor data may be input into the machine-learning pipeline as raw sensor data and/or as pre-processed sensor data. For instance, the sensor data may be processed to include positional embedding, padding, timing data (e.g., time stamps), or the like. Additionally, in some examples, the different sensor data received from the different sensor modalities may be time synchronized (e.g., based on the timing data) such that all of the different sensor data representing substantially a same instance or period of time can be input to the machine-learning pipeline concurrently. In some examples, some of the sensor data, such as lidar data, may be input into a convolutional neural network prior to being input into any machine-learned models having attention-based modules.

In some examples, the machine-learning pipeline may include one or more machine-learned models having a multi-attention module. For instance, each of the different types of sensor data from the different sensor modalities may be input into their own respective multi-head multi-attention machine-learned model. As an example, if audio data is received from one or more microphones, all of the audio data may be input into a first machine-learned model that includes a multi-attention module. Similarly, if image data is received from one or more cameras, all of the image data may be input into a second machine-learned model that includes a multi-attention module, and so forth.

In some examples, the machine-learning pipeline may include a machine-learned model having a multi-attention component (e.g., cross-attention). In examples, outputs of the machine-learned models having the multi-attention modules (described in the preceding paragraph) may be input into the machine-learned model having the multi-attention component. In some examples, the multi-attention component of the machine-learned model may correlate various feature(s) between the different sensor data such that feature(s) in the first sensor data may draw attention to feature(s) in the second sensor data, and vice-versa. In other words, and for example, an extracted feature from the first sensor data may be indicative of a presence of an object in the environment, and this extracted feature may draw the machine-learned model's attention to another feature in the second sensor data that is also indicative of the object's presence. For instance, an extracted feature from audio data may draw the machine-learned model's attention to a feature in image data, lidar data, etc. that is associated with an object. In some examples, both of these features may be associated or otherwise indicative of a location of an object in the environment.

In some examples, the multi-attention component may correlate the features in different feature vectors determined based on different sensor data. In performing this multi-attention correlation, the multi-attention component may, in some examples, input a query matrix associated with first sensor data and a key matrix and/or a value matrix associated with second sensor data into a first attention component (e.g., self-attention component). Additionally, the multi-attention component may input, into a second attention component, a query matrix associated with the second sensor data and a key matrix and/or a value matrix associated with the first sensor data. In some examples, the outputs of the first and second attention components may be correlated, concatenated, fed into a multilayer perceptron neural network, or the like. In some examples, the output from the machine-learned model having the multi-attention component may be indicative of locations of objects in the environment, as well as other information associated with those objects, such as speed, size, pose, etc.

In some examples, the machine-learning pipeline may further include another machine-learned model or component that is configured to determine classifications of objects detected in the environment by the prior model(s) and processes of the machine-learning pipeline. For instance, the other machine-learned model may be configured to determine whether an object is a vehicle, a pedestrian, a cyclist, an animal, a building, vegetation, a traffic control object, or the like. Additionally, in some instances, the other machine-learned model may determine whether a vehicle is an emergency vehicle, as well as what type of emergency vehicle the object is (e.g., ambulance, police car, fire engine, etc.).

In some examples, the output(s) from the machine-learning pipeline may be sent to a planner and/or prediction component of the vehicle. A prediction component may predict possible future actions/trajectories of objects within an environment. The planner component may determine one or more actions to perform to control the vehicle based on the output(s). For instance, the planner component may determine a trajectory for the vehicle to follow through the environment based on the output indicating the location of the object. Additionally, or alternatively, the planner component may determine trajectories based on classifications of object. For instance, if the output indicates that an object is an emergency vehicle, the planner may determine to cause the vehicle to pull over or otherwise yield to the emergency vehicle, if necessary. Additionally, or alternatively, the planner component may determine to invoke a human teleoperator to temporarily control the vehicle based on detecting a presence of an emergency vehicle.

In some examples, the machine-learning pipeline and/or the one or more machine-learned models of the machine-learning pipeline may be trained end-to-end. That is, rather than training each modality, model, process, module, etc. individually, all of the models, processes, modules, etc. of the machine-learning pipeline may be trained together by inputting a set a of known or annotated ground truth data and then altering one or more parameters of the models, processes, modules, etc. based on an output from the machine-learning pipeline to align with the ground truth data. In some examples, training the machine-learning pipeline end-to-end may include, initially, building an initial dataset. The initial dataset could, in some instances, be data from the internet, data that is mined from past experiments, simulated data, or the like. After the dataset is determined, the data may be annotated (e.g., by a human annotator or a machine). After the dataset is annotated, the data/dataset may be input into the machine-learning pipeline for training. In some examples, the trained machine-learning pipeline may be used to mine addition data and extract new samples, such as samples of detecting objects, including emergency vehicles. In some examples, the machine-learning pipeline and the individual models, processes, modules, etc. may be evaluated based on performance metrics. If the performance of the machine-learning pipeline is acceptable, the pipeline may be released into production for online use in vehicles. However, if the performance of the machine-learning pipeline is not acceptable, the pipeline may be further trained for additional improvement. For instance, if an output of the model is incorrect, one or more parameters of the machine-learning pipeline, including parameters of individual models, processes, modules, etc. may be altered to improve the model.

According to the techniques described herein, several advantages in computer-related technology may be realized. For instance, by utilizing a multi-attention component in a machine-learned model to correlate features between sensor data generated by different sensor modalities, machine-learned models can make detections with greater accuracy and confidence. That is, because the multi-attention component techniques described herein can extract features from one modality of sensor data to draw the machine-learned model's attention to other features in other modalities of sensor data, the machine-learned model can make detections by combining different senses similar to the way a human being would (e.g., identifying an emergency vehicle based on seeing the emergency vehicle, hearing sirens, seeing flashing lights, etc.).

Additionally, the techniques described herein can improve the safe operation of autonomous vehicles. For instance, the disclosed techniques, among other things, improve an autonomous vehicle's ability to identify/classify certain objects in an environment (e.g., occluded objects, emergency vehicles, etc.), as well as identify certain situations in an environment (e.g., emergency situations such as an accident scene, crime scene, etc.). Being able to detect and/or classify certain objects (e.g., emergency vehicles, for one) is critical for the overall safety and quality of autonomous driving. The technologies disclosed herein can classify objects based on a combination of sensor modalities, such as vision (e.g., images), lidar, and audio signals. For instance, using the technologies described herein, vehicles can be classified, with high certainty, into different classifications of vehicles (e.g., cars, trucks, busses, emergency vehicles, etc.), as well as different sub-classifications of those vehicles, (e.g., for emergency vehicles, whether the vehicle is an ambulance, police car/truck, fire engine, etc.). This is due to the ability to process and analyze different modalities of sensor data in combination as a human being would naturally process information using a combination of their senses (e.g., sight, smell, hearing, touch, taste, etc.).

The techniques described herein can be implemented in a number of ways. Example implementations are provided below with reference to the following figures. Example implementations are discussed in the context of autonomous vehicles: however, the methods, apparatuses, and components described herein can be applied to a variety of components (e.g., a sensor component or a robotic platform), and are not limited to autonomous vehicles. For example, the techniques can be utilized in semi-autonomous vehicles, driver assistance systems for manually driven vehicles, aviation or nautical contexts, manufacturing contexts, or in other contexts employing temporal sensor systems. Additionally, while several of the examples described herein are with respect to detecting/classifying emergency vehicles for simplicity and ease of understanding, the techniques described herein can be used for detecting/classifying any number of different objects using different sensor modalities.

FIG. 1 illustrates an example process 100 associated with using multi-attention machine-learning for vehicle perception. In examples, the vehicle 102 may include one or more sensor(s) 104, such as audio sensor(s) 106 (e.g., microphones), image sensor(s) 108 (e.g., cameras), lidar sensor(s) 110, radar sensor(s) 112, and/or the like. In at least one example, the sensor(s) 104 may capture sensor data associated with an environment 114 surrounding the vehicle 102. For instance, the audio sensor(s) 106 may generate audio data 116 associated with the environment 114, the image sensor(s) 108 may generate image data 118 associated with the environment 114, the lidar sensor(s) 110 may generate lidar data 120 associated with the environment 114, and the radar sensor(s) 112 may generate radar data 122 associated with the environment 114. In at least one example, the sensor(s) 104 may include, in addition, or in the alternative, to the audio sensor(s) 106, the image sensor(s) 108, the lidar sensor(s) 110, and/or the radar sensor(s) 112, ultrasonic transducers, sonar sensors, location sensors (e.g., global positioning component (GPS), compass, etc.), inertial sensors (e.g., inertial measurement units, accelerometers, magnetometers, gyroscopes, etc.), wheel encoders, environmental sensors (e.g., temperature sensors, humidity sensors, light sensors, pressure sensors, smoke sensors, etc.), time of flight (ToF) sensors, etc. In some examples, one or more of the sensor(s) 104 may be housed within one or more sensor pods coupled to the vehicle 102. In some instances, a single sensor pod may include one or more of the audio sensor(s) 106, image sensor(s) 108, lidar sensor(s) 110, radar sensor(s) 112, time of flight sensors, accelerometers, and/or the like. In examples, the type(s) of sensor data generated by the sensor(s) 104 may include, in addition to the audio data 116, image data 118, lidar data 120, and/or the radar data 122, ultrasonic transducer data, sonar data, location data (e.g., global positioning component (GPS), compass, etc.), pose data, inertial data (e.g., inertial measurement units data, accelerometer data, magnetometer data, gyroscope data, etc.), wheel encoder data, environmental data (e.g., temperature sensor data, humidity sensor data, light sensor data, pressure sensor data, smoke sensor data, etc.), ToF sensor data, etc.

In examples, the environment 114 may include one or more objects, such as the emergency vehicle 124 and the pedestrian 126. As such, the sensor data, including one or more of the audio data 116, image data 118, lidar data 120, and/or the radar data 122, may include data associated with the one or more objects. For instance, the audio data 116 may include audio signatures associated with audio 128 output by one or more siren(s) of the emergency vehicle. Additionally, the image data 118 may include images of the flashing lights 130 of the emergency vehicle 124, as well as the emergency vehicle 124 itself and/or the pedestrian 126. Additionally, the lidar data 120 and/or the radar data 122 may include point clouds associated with the emergency vehicle 124 and/or the pedestrian 126.

In some examples, one or more of the audio data 116, the image data 118, the lidar data 120, and/or the radar data 122 may be input into a machine-learning pipeline 132, which may be running on one or more computing device(s) of the vehicle 102. The machine-learning pipeline 132 may include one or more machine-learned model(s) 134, one or more multi-attention component(s) 136, one or more multi-attention module(s) 138, and a multilayer perceptron 140 neural network. Although shown as separate entities for ease of illustration, it is to be understood that one or more of the machine-learned model(s) 134 may include the multi-attention component(s) 136 and/or the multi-attention module(s) 138 as a module that runs within the machine-learned model.

In some examples, one or more of the audio data 116, the image data 118, the lidar data 120, and/or the radar data 122 may be input into the machine-learning pipeline 132 as raw sensor data and/or as pre-processed sensor data. For instance, one or more of the audio data 116, the image data 118, the lidar data 120, and/or the radar data 122 may be processed to include positional embedding, padding, or the like. Additionally, in some examples, one or more of the audio data 116, the image data 118, the lidar data 120, and/or the radar data 122 may be time synchronized such that all of the different sensor data represents substantially the same instance or period of time. In some examples, some of the sensor data, such as the lidar data 120, may be input into a convolutional neural network prior to being input into the machine-learning pipeline 132 and/or any of the machine-learned model(s) 134 having attention-based modules.

In some examples, after being input into the machine-learning pipeline 132, one or more of the audio data 116, the image data 118, the lidar data 120, and/or the radar data 122 may be input into their own respective machine-learned model 134 having a multi-head multi-attention module 138. As an example, the audio data 116 may be input into a first one of the machine-learned model(s) 134 that includes a multi-attention module 138, the image data 118 may be input into a second one of the machine-learned model(s) 134 that includes a multi-attention module 138, and so forth.

In some examples, outputs of the machine-learned model(s) 134 having the multi-attention modules 138 may be input into a machine-learned model 134 having a multi-attention component 136. In some examples, the multi-attention component(s) 136 may correlate various feature(s) between the different sensor data such that feature(s) in one modality of sensor data (e.g., audio data 116) may draw attention to feature(s) in another modality of sensor data (e.g., image data 118, lidar data 120, etc.), and vice-versa. In other words, and for example, an extracted feature from one modality of sensor data may be indicative of a presence of an object in the environment 114, and this extracted feature may draw the machine-learned model's attention to another feature in the other modality of sensor data that is also indicative of the object's presence. For instance, an extracted feature from the audio data 116 (e.g., an audio signal and direction associated with the audio 128 of the emergency vehicle 124) may draw the machine-learned model's attention to a feature in the image data 118 (e.g., an image of the emergency vehicle 124 and/or the flashing lights 130), the lidar data 120, etc.

In some examples, the multi-attention component(s) 136 may correlate features that are included in different feature vectors and/or feature vector matrices determined based on different sensor data. In performing this multi-attention correlation, the multi-attention component(s) 136 may, in some examples, input a query matrix associated with first sensor data (e.g., audio data 116) and a key matrix and/or a value matrix associated with second sensor data (e.g., lidar data 120) into a first attention component. In some examples, the first attention component may be similar to or the same as a multi-attention module, such as the multi-attention module(s) 138. Additionally, the multi-attention component(s) 136 may input, into a second attention component, a query matrix associated with the second sensor data (e.g., lidar data 120) and a key matrix and/or a value matrix associated with the first sensor data (e.g., audio data 116). In some examples, the outputs of the first and second attention components may be correlated, concatenated, fed into a multilayer perceptron 140 neural network, or the like. In some examples, the output from the machine-learned model having the multi-attention component may be indicative of locations of objects in the environment 114, as well as information associated with those objects.

In some examples, one of the machine-learned model(s) 134 of the machine-learning pipeline 132 may be configured to determine classifications of objects detected in the environment 114 by other model(s) of the machine-learning pipeline 132. For instance, such a machine-learned model may be configured to determine whether an object is a vehicle, a pedestrian 126, a cyclist, an animal, a building, vegetation, a traffic control object, or the like. Additionally, in some instances, this classifier machine-learned model may determine whether a vehicle is an emergency vehicle 124, as well as what type of emergency vehicle it is (e.g., ambulance, police car, fire engine, etc.).

In some examples, output(s) 142 from the machine-learning pipeline 132 may include object detection(s), object classification(s), object location(s), sizes of object(s), and/or the like. In some examples, the output(s) 142 may be sent to a planner component 144 of the vehicle 102. The planner component 144 may determine one or more actions to perform to control the vehicle 102 based on the output(s) 142. For instance, the planner component 144 may determine a trajectory 146 for the vehicle 102 to follow in the environment 114 based on the output(s) 142 indicating the presence of the emergency vehicle 124 and/or the pedestrian 126. Additionally, or alternatively, the planner component 144 may determine trajectories based on classifications of objects. For instance, if the output(s) 142 indicates that an object is an emergency vehicle 124, the planner component 144 may determine to cause the vehicle 102 to pull over or otherwise yield to the emergency vehicle 124, if necessary. Additionally, or alternatively, the planner component 144 may determine to invoke a human teleoperator to temporarily control the vehicle 102 based on detecting a presence of an emergency vehicle 124, construction zone, accident scene, etc.

Figure 2:
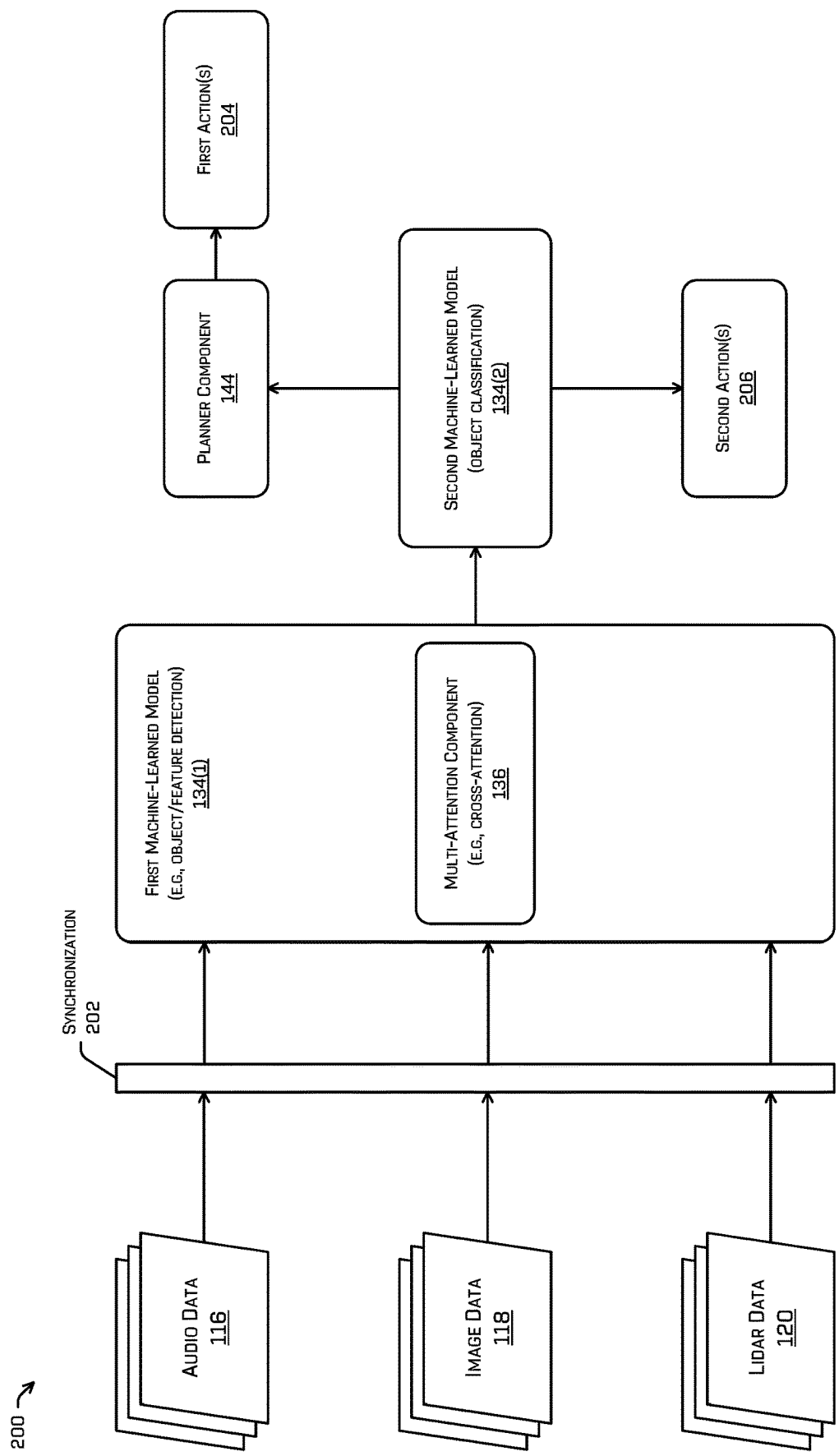
FIG. 2 illustrates an example data flow associated with a machine-learning pipeline that includes multi-attention machine-learning for vehicle perception.

FIG. 2 illustrates an example data flow 200 associated with a machine-learning pipeline that includes multi-attention machine-learning for vehicle perception. Beginning from the left, audio data 116, image data 118, and lidar data 120 are synchronized using a synchronization component 202. For instance, the audio data 116, the image data 118, and the lidar data 120 may be synchronized such that each data set represents a similar or same instance or period of time.

After synchronization, the synchronized audio data 116, image data 118, the lidar data 120 may be input into a first machine-learned model 134(1). The first machine-learned model 134(1) may include a multi-attention component 136 and be configured to detect objects in an environment. Additionally, or alternatively, the first machine-learned model 134(1) may be configured to determine or otherwise associate features with those detected objects. Such features could include sounds (e.g., an engine, siren, horn, voice, etc.), lights (e.g., flashing lights), speed, size, and/or the like.

Outputs from the first machine-learned model 134(1) may be fed into a second machine-learned model 134(2). The second machine-learned model 134(2) may be configured to determine classifications associated with the detected objects. For instance, the second machine-learned model 134(2) may be configured to classify an object as a vehicle, a pedestrian, a cyclist, an animal, a building, vegetation, a traffic control object, or the like. Additionally, the second machine-learned model 134(2) may include intelligence to determine specific classifications of certain object. For instance, the second machine-learned model 134(2) may determine whether a vehicle is a car, truck, bus, van, or the like. Additionally, the second machine-learned model 134(2) may determine whether or not a vehicle is an emergency vehicle, as well as what type of emergency vehicle (e.g., ambulance, police vehicle, fire engine, etc.), in some instances.

In some examples, if the second machine-learned model 134(2) determines that an object is of a certain type of classification, different action(s) can be performed. For instance, if the second machine-learned model 134(2) determines that a detected object is an emergency vehicle, then the output may be provided to the planner component 144. The planner component 144 may then cause one or more first action(s) 204 to be performed based at least in part on the presence of the emergency vehicle. In examples, the first action(s) 204 may include causing the vehicle to pull over or otherwise yield to the emergency vehicle, initiating a call with a human teleoperator to control operation of the vehicle while the emergency vehicle is present, or the like. In other examples, if the second machine-learned model 134(2) determines that the object is not an emergency vehicle, one or more second action(s) 206 may be performed. In some examples, the second action(s) 206 may include refraining from providing the planner component 144 with a classification of the object, providing the planner component 144 with data associated with the detection of the object (e.g., the object's location, size, speed, etc.), and/or the like.

Figure 3:
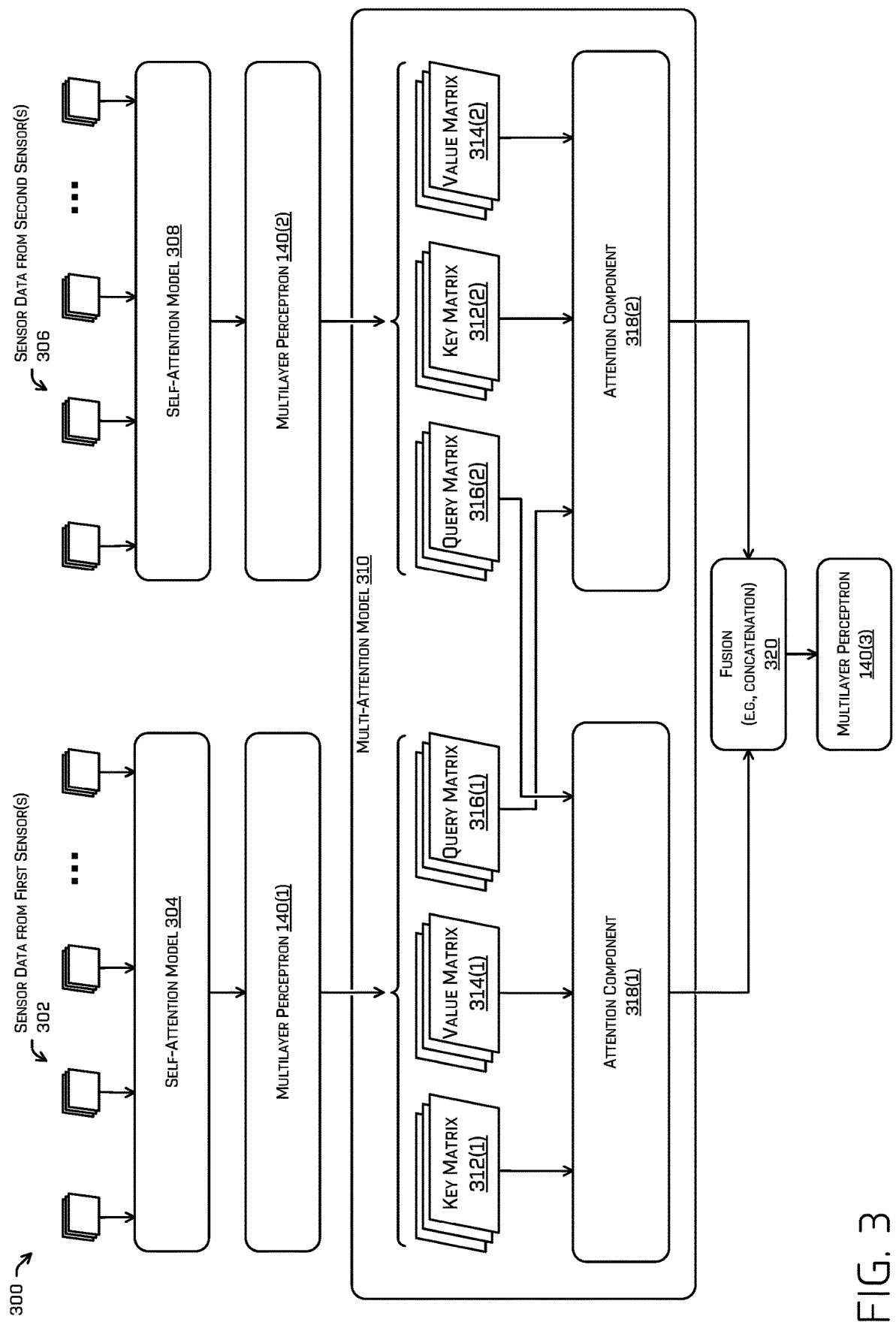
FIG. 3 illustrates example detail of a portion of a machine-learning pipeline that includes a multi-attention component.

FIG. 3 illustrates example detail 300 of a portion of a machine-learning pipeline that includes a multi-attention component. In examples, sensor data 302 from one or more first sensor(s) may be input into a multi-attention model 304 (e.g., a machine-learned model that includes a multi-attention module). In some examples, the first sensor(s) may all be of the same modality (e.g., all microphones). Additionally, the different instances of sensor data 302 may represent sensor data that has been by different sensors of the same modality (e.g., four microphones). Similarly, sensor data 306 from one or more second sensor(s) may be input into another multi-attention model 308. In some examples, the second sensor(s) may all be of the same modality (e.g., all cameras). Additionally, the different instances of sensor data 306 may represent sensor data that has been by different sensors of the same modality (e.g., four cameras).

The outputs of the multi-attention models 304 and 308 may be provided to the multilayer perceptrons 140(1) and 140(2). The multilayer perceptrons 140(1) and 140(2) may comprise or otherwise represent a feed forward artificial neural network, in some examples.

After the multilayer perceptrons 140(1) and 140(2), the data may be fed into a multi-attention model 310 (e.g., a machine-learned model that includes a multi-attention component). In some examples, a key matrix 312(1) and 312(2), a value matrix 314(1) and 314(2), and a query matrix 316(1) and 316(2) may be determined for each of the data sets flowing from the different sensor data 302 and 306. The multi-attention model 310 may then, in some instances, swap the query matrices 316(1) and 316(2) from each of the data sets, as shown, to perform the multi-attention feature extraction. In some examples, other matrices besides the query matrices 316(1) and 316(2) may be swapped. The matrices are then input into different attention components 318(1) and 318(2). The attention components 318(1) and 318(2) may, in some examples, be multi-attention modules or similar to multi-attention modules. After this, the data sets may then be correlated, concatenated, or the like by a correlation component 320. The correlated outputs may then be provided to another multilayer perceptron 140(3) module.

Query matrices are provided as example data structures that can be applied to input data. The input data can be a portion of an image, point cloud, audio signature, etc. In example, the input data can be partitioned into different sections. For example, an image can be divided into several portions. In examples, a query matrix can be applied to multiple images in a time-ordered or other fashion or any combination of portions of individual frames or multiple frames. For lidar, radar, etc., a portion can be a 3D voxel partition that may likewise be divided across multiple captures. A portion may be a down-sampled portion of an image transformed into a vector (e.g., by collecting the red-green-blue pixel values of the down-sampled portion). Collectively, these types of input data structures can be referred to as spatial input structures as they may contain data encoded into a 2D or 3D array of data.

Audio input data can also be input wherein a query matrix may be applied across multiple portions of audio data (e.g., different frequency ranges, frames of time-ordered or other frequency captures, frequency (e.g., Fourier) transformations of the audio frequency capture(s), spectral densities, or the like. Audio data, as used herein, is non-spatial data. As disclosed herein, it may be difficult to obtain context information from both spatial and non-spatial data. This disclosure can be used to combine such data in an efficient manner and, more specifically, to use query or similar functions to more robustly combine data from multiple sensor modalities to output environmental context information (e.g., information regarding an ambulance or other emergency vehicle). In some examples, the query vector can be applied to feature vectors output from convolutional neural networks applied to spatial input data and/or multi-level perceptron(s) applied to non-spatial/audio data.

The query matrix is an example of a type of data structure that can be used to output a relative contribution of multiple portions of input data. For example, one way to classify an ambulance in an environment may be to segment an image and classify a segment of that image as an ambulance based on features of that segment corresponding to the ambulance (e.g., the shape, colors, etc.). However, such a technique may ignore contextual data from other portions of the image. For example, vehicles moving out of the way of a vehicle may be indicative of an ambulance or the ambulance being located near a hospital in an image. The query matrix can be used to train a model to better output data (e.g., classification data, location data, etc.) about an object in an environment by using contextual clues across an input data set (e.g., to apply a weighted attention across different portions of the input data set). The disclosed techniques can extend this methodology across multiple modalities in an efficient manner and combine disparate types of input data (e.g., spatial and non-spatial input data).

In examples, a multi-attention (e.g., self-attention) model may use a query matrix that is limited to a modality (e.g., vision data may be processed using a query matrix that is applied to different portions of vision data).

Figure 4:
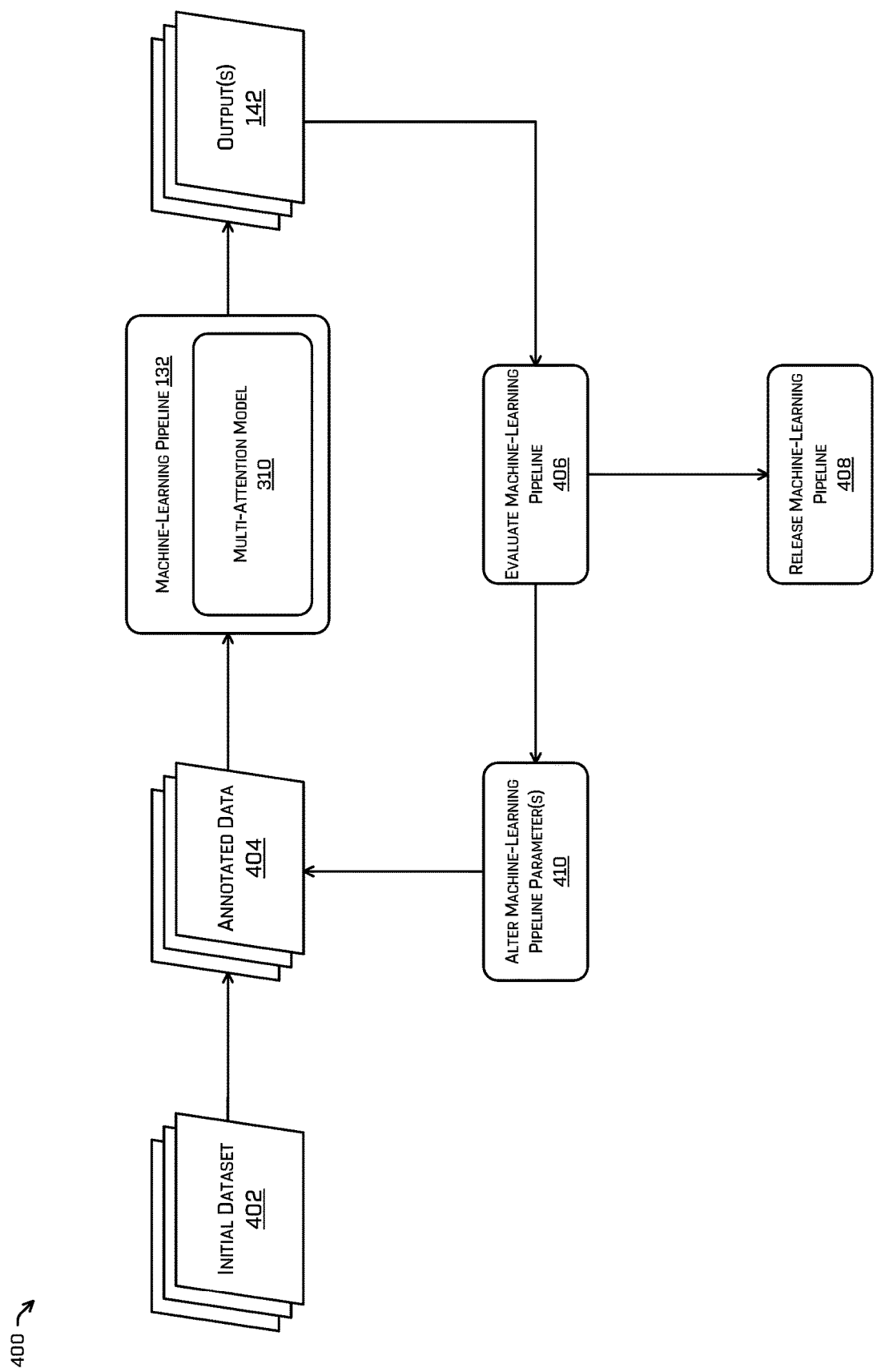
FIG. 4 is a data flow diagram illustrating an example process associated with training a machine-learned model that includes a multi-attention component.

FIG. 4 is a data flow diagram illustrating an example process 400 associated with training a machine-learning pipeline 132 that includes a multi-attention model 310. In some examples, the process 400 represents an end-to-end training of the machine-learning pipeline 132, which may include other models, modules, processes, and/or subprocesses. That is, rather than training each model, process, module, etc. individually, all of the models, processes, modules, etc. of the machine-learning pipeline 132 may be trained together by inputting a set a of known or annotated data and then altering one or more parameters of the models, processes, modules, etc. based on an output from the machine-learning pipeline.

Initially, an initial dataset 402 is selected. The initial dataset 402 may, in some instances, be data from the internet, past collected sensor data from vehicles or other platforms, data that is mined from past experiments, simulated data, or the like. After the initial dataset 402 is determined, the dataset may be annotated (e.g., by a human annotator or a machine), as annotated data 404. The annotated data 404 (e.g., annotated dataset) may then be input into the machine-learning pipeline 132 for training. Based on this inputted annotated data 404, output(s) 142 may be received from the machine-learning pipeline 132. These output(s) 142 may then be used, at operation 406, to evaluate the machine-learning pipeline 132. For instance, the machine-learning pipeline may be evaluated based on one or more performance metric(s). If the performance of the machine-learning pipeline 132 is acceptable, then the process may proceed to operation 408 where the machine-learning pipeline 132 is released into production for online use in vehicles. However, if the performance of the machine-learning pipeline 132 is not acceptable, the process may proceed to operation 410 where one or more parameter(s) of the machine-learning pipeline 132 (including parameters of individual models therein) may be altered to improve the performance of the machine-learning pipeline 132. The process then proceeds back to where the annotated data 404 is input into the machine-learning pipeline 132 that includes the altered parameter(s).

Figure 5:
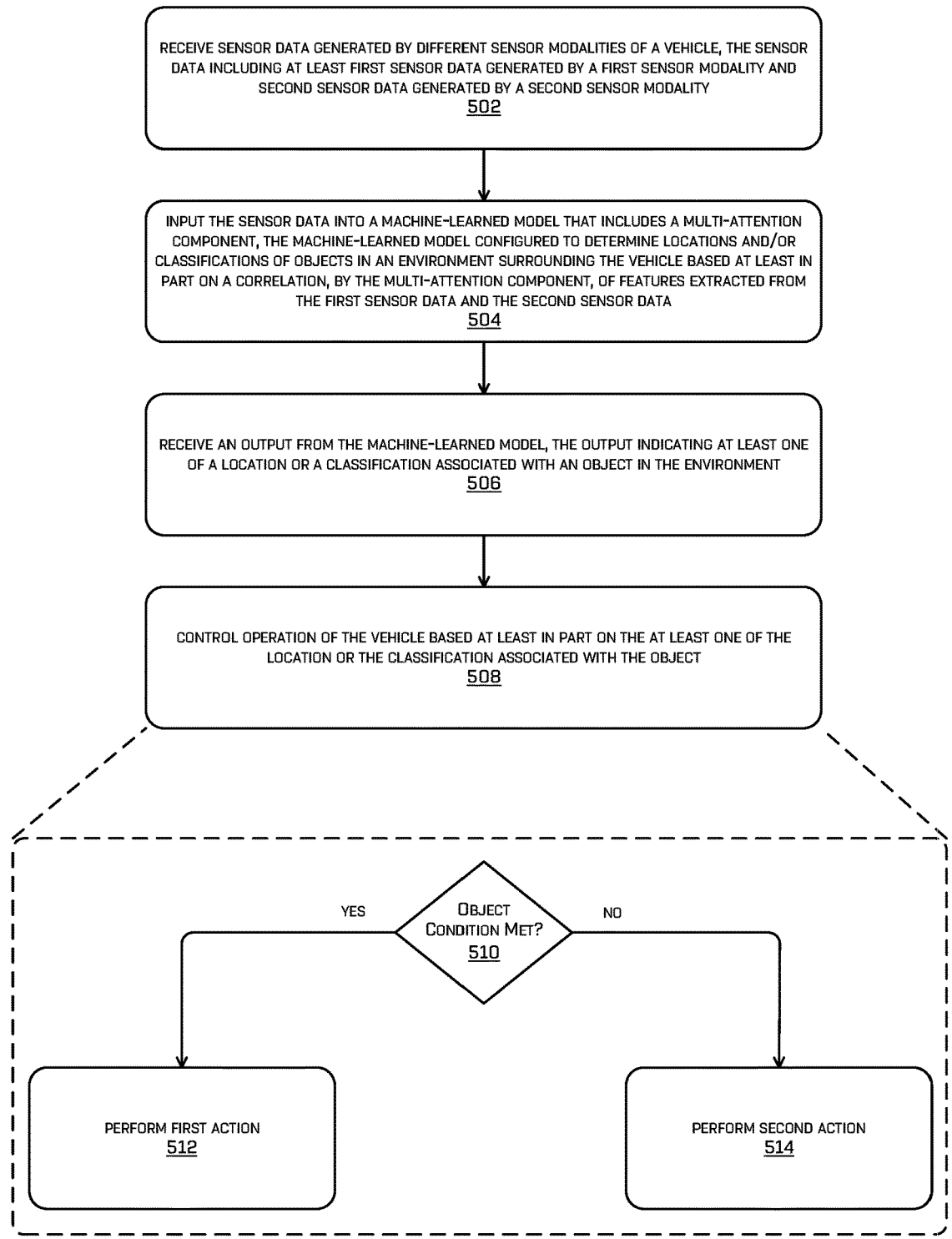
FIG. 5 is a flowchart illustrating an example process associated with the technologies disclosed herein for utilizing a machine-learning pipeline that includes a multi-attention component for object detection and/or classification.

FIG. 5 is a flowchart illustrating an example process 500 associated with the technologies disclosed herein for utilizing a machine-learning pipeline that includes a multi-attention component for object detection and/or classification. By way of example, the process 500 is illustrated as a logical flow graph, and each operation of it represents a sequence of operations that can be implemented in hardware, software, or a combination thereof. In the context of software, the operations may represent computer-executable instructions stored on one or more computer-readable storage media that, when executed by one or more processors, perform the recited operations. Generally, computer-executable instructions may include routines, programs, objects, components, data structures, and the like that perform particular functions or implement particular abstract data types.

In the process 500, the order in which the operations are described is not intended to be construed as a limitation, and any number of the described operations can be combined (or omitted) in any order and/or in parallel to implement the process 500. In some examples, multiple branches represent alternate implementations that may be used separately or in combination with other operations discussed herein. The process 500 illustrated may be described with reference to components and elements described above with reference to FIGS. 1-4 for convenience and ease of understanding. However, the process 500 is not limited to being performed using these components, and the components are not limited to performing the process 500.

The process 500 begins at operation 502, which includes receiving sensor data generated by different sensor modalities of a vehicle, the sensor data including at least first sensor data generated by a first sensor modality and second sensor data generated by a second sensor modality. For instance, a computing device of the vehicle 102 may receive the sensor data generated by the different sensor modalities of the vehicle 102. In some examples, the sensor data may include audio data, image data, lidar data, radar data, and/or the like.

At operation 504, the process 500 includes inputting the sensor data into a machine-learned model that includes a multi-attention component, the machine-learned model configured to determine locations and/or classifications of objects in an environment surrounding the vehicle based at least in part on a correlation, by the multi-attention component, of features extracted from the first sensor data and the second sensor data. For instance, the audio data 116, the image data 118, the lidar data 120, and/or the radar data 122 may be input into the machine-learned model 134 that includes a multi-attention component 136. In some examples, the sensor data may be synchronized prior to being input into the machine-learned model. Additionally, in some examples, the sensor data may be input into one or more machine-learned models that include multi-attention modules prior to being input into the machine-learned model that includes the multi-attention component.

At operation 506, the process 500 includes receiving an output from the machine-learned model, the output indicating at least one of a location or a classification associated with an object in the environment. For instance, the planner component 144 may receive the output(s) 142 from the machine-learned model 134 (or the machine-learning pipeline 132). Additionally, as an example, the classification associated with the object may include whether the object is a vehicle, a pedestrian, an animal, a cyclist, a building, vegetation, a traffic control object, or the like. Even further, the classification may indicate whether an object is an emergency vehicle, such as an ambulance, police vehicle, fire engine, etc.

At operation 508, the process 500 includes controlling operation of the vehicle based at least in part on the at least one of the location or the classification associated with the object. For instance, the planner component 144 may control operation of the vehicle 102 based at least in part on the location or the classification. In some examples, controlling operation of the vehicle may include the operations 510-514.

At operation 510, controlling operation of the vehicle may include determining whether a condition associated with the object is met. For instance, the condition associated with the object may include whether the object is an emergency vehicle or a non-emergency vehicle, a vehicle or a pedestrian, a size of the object, and/or the like. If, at operation 510, it is determined that the condition associated with the object is met, the process proceeds to operation 512. However, if it is determined that the condition associated with the object is not met, the process proceeds to operation 514.

At operation 512, the process 500 includes performing a first action. In some examples, the first action may include causing, by the planner component 144, the vehicle 102 to pull over or otherwise yield to an emergency vehicle for a period of time while the emergency vehicle is present in the environment and/or proximate the vehicle. As another example, the first action may include sending an indication to invoke a human teleoperator to control operation of the vehicle. In some examples, the first action may include causing the vehicle to slow down for a child pedestrian.

At operation 514, the process 500 includes performing a second action. In some examples, the second action may include submitting an indication to the planner component that the object is not an emergency vehicle, or refraining from entering a caution state associated with encountering emergency vehicles. Additionally, or alternatively, the second action may include sending an indication of the classification of the object to a downstream component of the vehicle, or maintaining a current driving state.

Figure 6:
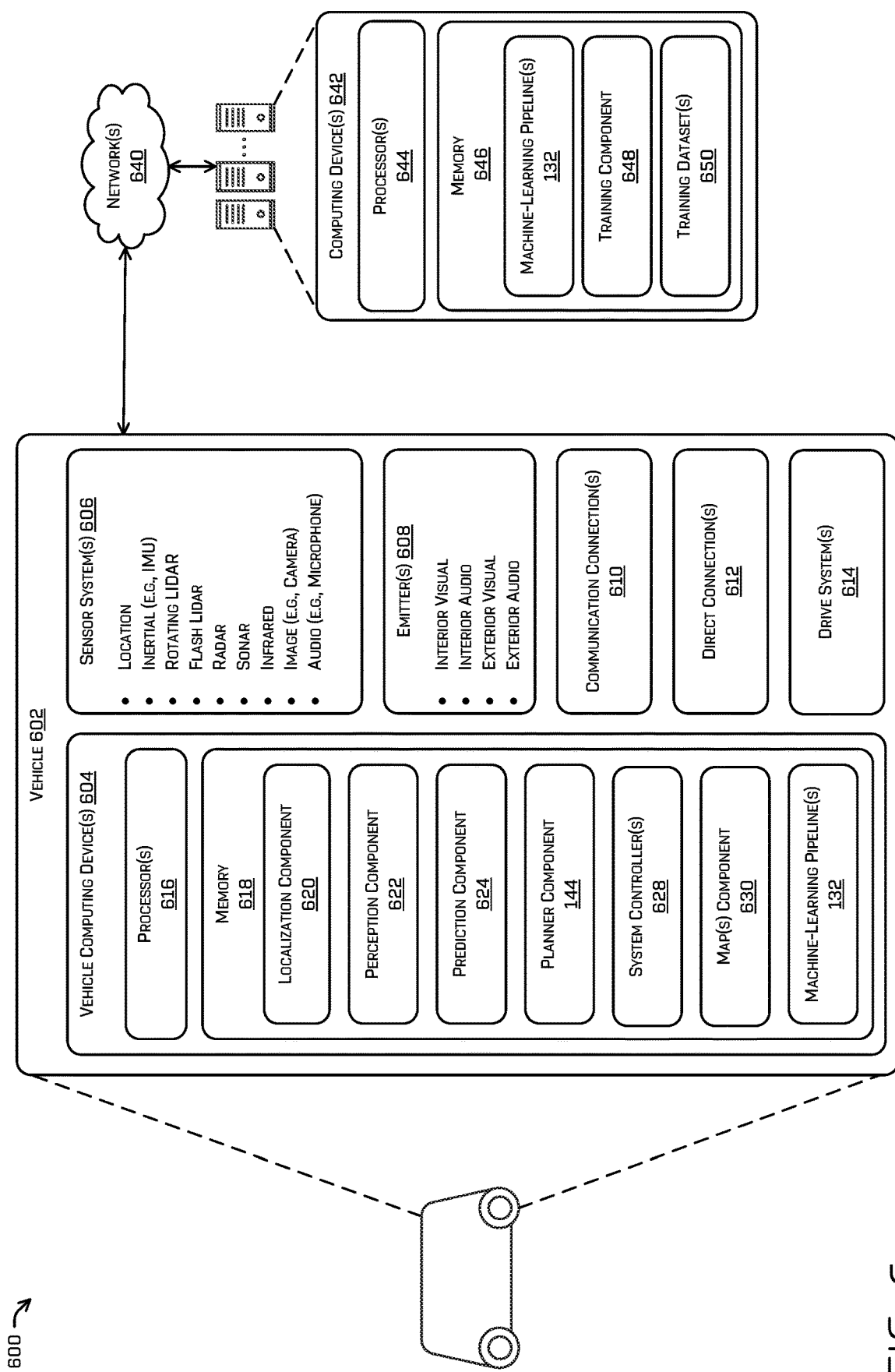
FIG. 6 is a block diagram illustrating an example system that may be used for performing the techniques described herein.

FIG. 6 is a block diagram illustrating an example system 600 that may be used for performing the techniques described herein. In at least one example, a vehicle 602, which can correspond to the vehicle 102 described above with reference to FIGS. 1-5, can include one or more vehicle computing device(s) 604, one or more sensor system(s) 606, one or more emitter(s) 608, one or more communication connection(s) 610, one or more direct connection(s) 612, and one or more drive system(s) 614.

In at least one example, a vehicle 602 can be an autonomous vehicle configured to operate according to a classification issued by the U.S. National Highway Traffic Safety Administration, which describes a vehicle capable of performing all safety-critical functions without the driver (or occupant) being expected to control the vehicle at any time. In such an example, since the vehicle 602 can be configured to control all functions from start to stop, including all parking functions, it can be unoccupied. This is merely an example, and the components and methods described herein can be incorporated into any ground-borne, airborne, or waterborne vehicle, including those ranging from vehicles that need to be manually controlled by a driver at all times, to those that are partially or fully autonomously controlled. That is, in the illustrated example, the vehicle 602 is an autonomous vehicle; however, the vehicle 602 could be any other type of vehicle. While only a single vehicle 602 is illustrated in FIG. 6, in a practical application, the example system 600 can include a plurality of vehicles, which, in some examples, can comprise a fleet of vehicles.

The vehicle computing device(s) 604 can include processor(s) 616 and memory 618 communicatively coupled with the processor(s) 616. In the illustrated example, the memory 618 of the vehicle computing device(s) 604 stores a localization component 620, a perception component 622, a prediction component 624, a planner component 144, one or more system controller(s) 628, a map(s) component 630, and one or more machine-learning pipeline(s) 132.

In at least one example and as described above, the localization component 620 can determine a pose (position and orientation) of the vehicle 602 in relation to a local and/or global map based at least in part on sensor data received from the sensor system(s) 606 and/or map data associated with a map of an environment in which the vehicle 602 is operating (e.g., provided by the map(s) component 630).

In at least one example, the perception component 622 can perform object detection, segmentation, and/or classification based at least in part on sensor data received from the sensor system(s) 606. In at least one example, the perception component 622 can receive raw sensor data from the sensor system(s) 606. In at least one example, the perception component 622 can receive sensor data and can utilize one or more processing algorithms and/or machine-learned models to perform object detection, segmentation, and/or classification with respect to object(s) identified in the sensor data. In some examples, the perception component 622 can associate a bounding region (e.g., bounding box or otherwise an instance segmentation) with an identified object and can associate a confidence score associated with a classification of the identified object with the identified object. In at least one example, the perception component 622 can include the machine-learning pipeline 132 and or machine-learned models that are configured to perform the technologies disclosed herein.

The prediction component 624 can receive sensor data from the sensor system(s) 606, map data, and/or perception data output from the perception component 622 (e.g., processed sensor data) and can output predictions associated with one or more objects within the environment of the vehicle 602. Predictions can include predicted trajectories associated with objects in the environment in which the vehicle 602 is operating.

The planner component 144 may receive data, information, and/or outputs from the localization component 620, the perception component 622, the prediction component 624, the map(s) component 630, and/or the machine-learning pipeline(s) 132 and may generate one or more proposed vehicle operations (e.g., proposed trajectories). Additional details of localization components, perception components, prediction components, and/or planner components that are usable can be found in U.S. Pat. No. 9,612,123, issued on Apr. 4, 2017, and U.S. Pat. No. 10,363,390, issued on Jul. 16, 2019, the entire contents of both of which are incorporated by reference herein in their entirety and for all purposes. In some examples (e.g., where the vehicle 602 is not an autonomous vehicle), one or more of the aforementioned components can be omitted from the vehicle 602.

In at least one example, the vehicle computing device(s) 604 can include one or more system controller(s) 628, which can be configured to control steering, propulsion, braking, safety, emitters, communication, and other systems of the vehicle 602. These system controller(s) 628 can communicate with and/or control corresponding systems of the drive system(s) 614 and/or other systems of the vehicle 602.

The map(s) component 630 may store one or more map(s) associated with an environment in which the vehicle 602 operates. In some examples, the map(s) component 630 may include functionality to generate new maps representing an environment in real-time as the vehicle 602 operates, update maps associated with the environment, or the like.

While the components described above are illustrated as "onboard" the vehicle 602, in other implementations, the components can be remotely located and/or accessible to the vehicle 602. For instance, some or all of the components can be remotely located on the computing device(s) 642 and accessible to the vehicle 602 via one or more network(s) 640. Furthermore, while the components are described above as "components," such components can comprise one or more components and/or modules, which can be part of a system, for performing operations attributed to each of the components.

In at least one example, the localization component 620, the perception component 622, the prediction component 624, the planner component 144, the map(s) component 630, and/or the machine-learning pipeline(s) 132 can process data, as described above, and can send their respective outputs over the network(s) 640, to computing device(s) 642. In at least one example, the localization component 620, the perception component 622, the prediction component 624, the planner component 144, the map(s) component 630, and/or the machine-learning pipeline(s) 132 can send their respective outputs to the computing device(s) 642 at a particular frequency, after a lapse of a predetermined period of time, in near real-time, etc.

In at least one example, the sensor system(s) 606 can include lidar sensors (e.g., rotating lidar sensors, flash lidar sensors), radar sensors, ultrasonic transducers, sonar sensors, location sensors (e.g., GPS, compass, etc.), inertial sensors (e.g., inertial measurement units, accelerometers, magnetometers, gyroscopes, etc.), cameras (e.g., RGB, IR, intensity, depth, etc.), wheel encoders, audio sensors, environment sensors (e.g., temperature sensors, humidity sensors, light sensors, pressure sensors, etc.), ToF sensors, rolling shutter image sensors, etc. The sensor system(s) 606 can provide input to the vehicle computing device(s) 604. In some examples, the sensor system(s) 606 can preprocess at least some of the sensor data prior to sending the sensor data to the vehicle computing device(s) 604. In at least one example, the sensor system(s) 606 can send sensor data, via the network(s) 640, to the computing device(s) 642 at a particular frequency, after a lapse of a predetermined period of time, in near real-time, etc.

The vehicle 602 can also include one or more emitters 608 for emitting light and/or sound, as described above. The emitter(s) 608 in this example include interior audio and visual emitters to communicate with passengers of the vehicle 602. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 608 in this example also include exterior emitters. By way of example and not limitation, the exterior emitters in this example include light emitters (e.g., indicator lights, signs, light arrays, etc.) to visually communicate with pedestrians, other drivers, other nearby vehicles, etc., one or more audio emitters (e.g., speakers, speaker arrays, horns, etc.) to audibly communicate with pedestrians, other drivers, other nearby vehicles, etc., etc. In at least one example, the emitter(s) 608 can be positioned at various locations about the exterior and/or interior of the vehicle 602.

The vehicle 602 can also include communication connection(s) 610 that enable communication between the vehicle 602 and other local or remote computing device(s), such as the computing device(s) 642, as well as other remote or local computing device(s). For instance, the communication connection(s) 610 can facilitate communication with other local computing device(s) on the vehicle 602 and/or the drive system(s) 614. Also, the communication connection(s) 610 can allow the vehicle to communicate with other nearby computing device(s) (e.g., other nearby vehicles, traffic signals, etc.). The communications connection(s) 610 also enable the vehicle 602 to communicate with a remote teleoperations computing device or other remote services.

The communications connection(s) 610 can include physical and/or logical interfaces for connecting the vehicle computing device(s) 604 to another computing device or a network, such as network(s) 640. For example, the communications connection(s) 610 can enable Wi-Fi-based communication such as via frequencies defined by the IEEE 602.11 standards, short range wireless frequencies such as BLUETOOTH®, or any suitable wired or wireless communications protocol that enables the respective computing device to interface with the other computing device(s).

The direct connection(s) 612 can directly connect the drive system(s) 614 and other systems of the vehicle 602. In at least one example, the vehicle 602 can include drive system(s) 614. In some examples, the vehicle 602 can have a single drive system 614. In at least one example, if the vehicle 602 has multiple drive systems 614, individual drive systems 614 can be positioned on opposite ends of the vehicle 602 (e.g., the front and the rear, etc.). In at least one example, the drive system(s) 614 can include sensor component(s) to detect conditions of the drive system(s) 614 and/or the surroundings of the vehicle 602. By way of example and not limitation, the sensor component(s) can include wheel encoder(s) (e.g., rotary encoders) to sense rotation of the wheels of the drive system, inertial sensors (e.g., inertial measurement units, accelerometers, gyroscopes, magnetometers, etc.) to measure position and acceleration of the drive system, cameras or other image sensors, ultrasonic sensors to acoustically detect objects in the surroundings of the drive system, lidar sensors, radar sensors, etc. Some sensors, such as the wheel encoder(s), can be unique to the drive system(s) 614. In some cases, the sensor component(s) on the drive system(s) 614 can overlap or supplement corresponding systems of the vehicle 602 (e.g., sensor system(s) 606).

The drive system(s) 614 can include many of the vehicle systems, including a high voltage battery, a motor to propel the vehicle 602, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 614 can include a drive system controller which can receive and preprocess data from the sensor component(s) and to control operation of the various vehicle systems. In some examples, the drive system controller can include processor(s) and memory communicatively coupled with the processor(s). The memory can store one or more components to perform various functionalities of the drive system(s) 614. Furthermore, the drive system(s)

614 also include communication connection(s) that enable communication by the respective drive system with other local or remote computing device(s).

In FIG. 6, the vehicle computing device(s) 604, sensor system(s) 606, emitter(s) 608, and the communication connection(s) 610 are shown onboard the vehicle 602. However, in some examples, the vehicle computing device(s) 604, sensor system(s) 606, emitter(s) 608, and the communication connection(s) 610 can be implemented outside of an actual vehicle (i.e., not onboard the vehicle 602).

As described above, the vehicle 602 can send data to the computing device(s) 642, via the network(s) 640. In some examples, the vehicle 602 can send raw sensor data to the computing device(s) 642. In other examples, the vehicle 602 can send processed sensor data and/or representations of sensor data to the computing device(s) 642 (e.g., data output from the localization component 620, the perception component 622, the prediction component 624, the planner component 144, the machine-learning pipeline(s) 132 and/or any machine-learned models, etc.). In some examples, the vehicle 602 can send data to the computing device(s) 642 at a particular frequency, after a lapse of a predetermined period of time, in near real-time, etc.

The computing device(s) 642 can receive the data (raw or processed) from the vehicle 602 and/or other data collection devices, as well as data from one or more third-party sources and/or systems. In at least one example, the computing device(s) 642 can include processor(s) 644 and memory 646 communicatively coupled with the processor(s) 644. In the illustrated example, the memory 646 of the computing device(s) 642 stores the machine-learning pipeline(s) 132, a training component 648, and one or more training dataset(s) 650. In some examples, one or more of the systems and/or components can be associated with the vehicle 602 or other computing device(s) associated with the system 600 instead of, or in addition to, being associated with the memory 646 of the computing device(s) 642.

In some examples, the training component 648 may utilize the training dataset(s) 650 to train machine-learned models and/or the machine-learning pipeline(s) 132 to perform some or all of the technologies disclosed herein. The training component 648 may train the machine-learning pipeline 132 end to end using annotated data from the training dataset(s) 650.

The processor(s) 616 of the vehicle 602 and the processor(s) 644 of the computing device(s) 642 can be any suitable processor capable of executing instructions to process data and perform operations as described herein. By way of example and not limitation, the processor(s) 616 and 644 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

Memory 618 and 646 are examples of non-transitory computer-readable media. Memory 618 and 646 can store an operating system and one or more software applications, instructions, programs, and/or data to implement the methods described herein and the functions attributed to the various systems. In various implementations, the memory can be implemented using any suitable memory technology, such as static random receive memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

It should be noted that while FIG. 6 is illustrated as a distributed system, in some examples, components of the vehicle 602 can be associated with the computing device(s) 642 and/or the components of the computing device(s) 642 can be associated with the vehicle 602. That is, the vehicle 602 can perform one or more of the functions associated with the computing device(s) 642, and vice versa.

Furthermore, while the vehicle computing device(s) 604 and the computing device(s) 642 are shown to include multiple components, in some examples, such components can be associated with more or fewer individual components. For example, the localization component 620, the perception component 622, the prediction component 624, the planner component 144, the map(s) component 630, and/or the machine-learning pipeline(s) 132 can be combined into a single component. That is, while depicted as separate components, any one or more of the components can be combined.

Figure 7:
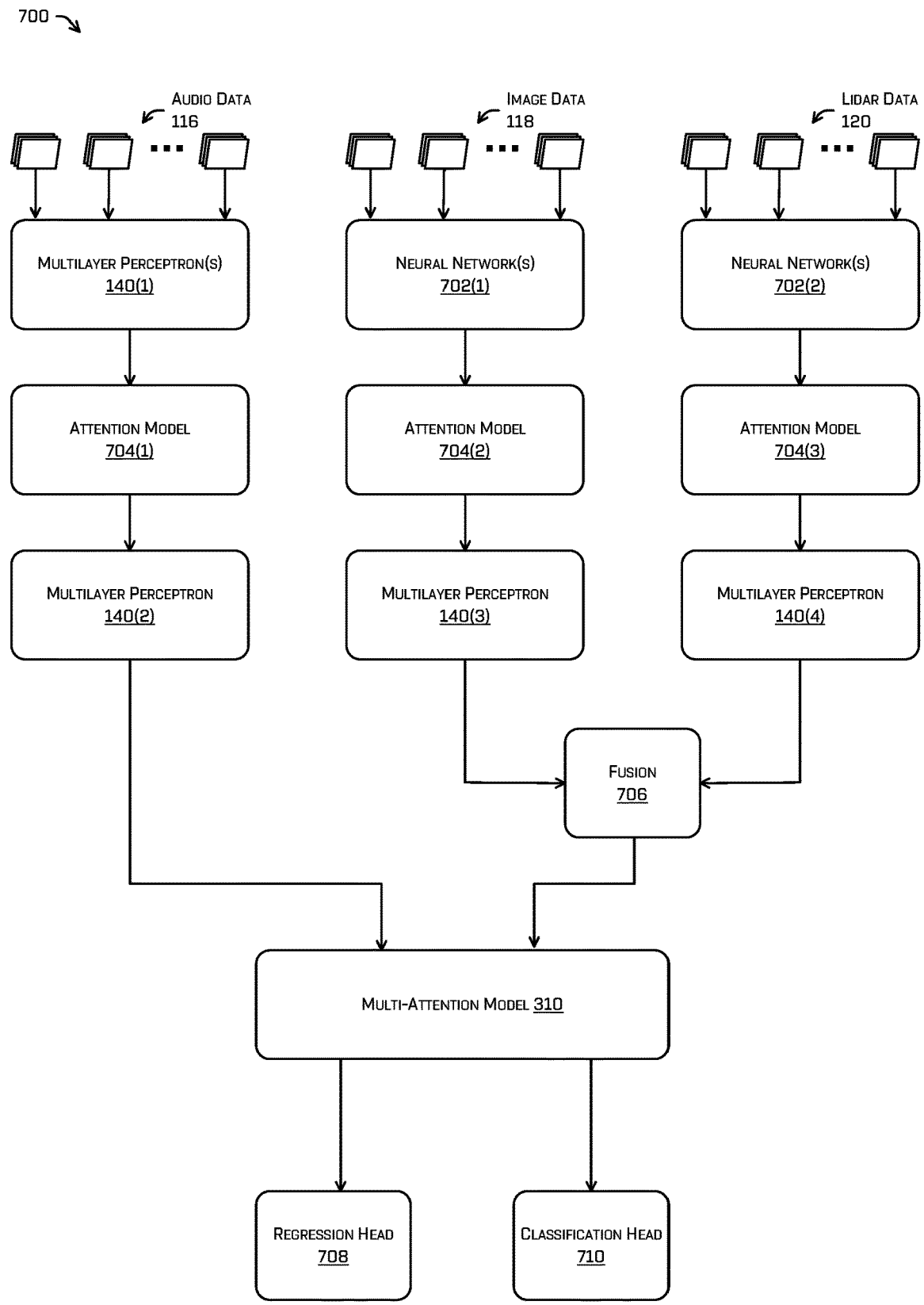
FIG. 7 illustrates example detail of a portion of a data-processing pipeline associated with a perception system that can combine different modalities of sensor data to determine object information.

FIG. 7 illustrates example detail of a portion of a data-processing pipeline 700 associated with a perception system that can combine different modalities of sensor data to determine object information. For instance, the pipeline 700 may process audio data 116, image data 118 (e.g., vision data), and lidar data 120 in combination to determine object information with greater accuracy, confidence, and while utilizing less computational overhead as opposed to processing the different sensor data individually.

With respect to processing the audio data 116, the pipeline 700 includes a first layer of one or more multilayer perceptron(s) 140. In some examples, the first layer of multilayer perceptron(s) 140(1) may include a respective multilayer perceptron component for each respective input feed of audio data 116. That is, if there are three feeds of audio data, the first layer of multilayer perceptron(s) 140(1) may include three multilayer perceptron components. The audio data 116 sub-pipeline may also include a first attention model 704(1) (e.g., a multi-attention model or a multi-attention model), and outputs of the first attention model 704(1) may be fed into a multilayer perception 140(2). As disclosed herein, the multiplayer perceptron can be used to output feature vector(s) corresponding to portion of the audio data 116. The portions can correspond to a respective frequency range, amplitude, Fourier/sinusoidal representation, etc The audio data 116 can be referred to as non-spatial information.

With respect to the image data 118 sub-pipeline, the image data 118 may be fed into a layer of one or more neural network(s) 702(1). The neural network(s) 702(1) may include convolutional neural network(s), in some examples. In some examples, the layer of neural network(s) 702(1) may include a respective neural network component for each respective input feed of image data 118. That is, if there are three feeds of image data 118, the layer of neural network(s) 702(1) may include three neural network components. The image data 118 sub-pipeline may also include a second attention model 704(2), and outputs of the second attention model 704(2) may be fed into a multilayer perception 140(3).

With respect to the lidar data 120 sub-pipeline, the lidar data 120 may be fed into a layer of one or more neural network(s) 702(2). The neural network(s) 702(2) may include convolutional neural network(s), in some examples.

In some examples, the layer of neural network(s) 702(2) may include a respective neural network component for each respective input feed of lidar data 120. That is, if there are three feeds of lidar data 120, the layer of neural network(s) 702(2) may include three neural network components. The lidar data 120 sub-pipeline may also include a third attention model 704(3), and outputs of the third attention model 704(3) may be fed into a multilayer perception 140(4). Neural networks 702(1) and/or 702(2) can be convolutional neural networks or the like to process spatial information such as image data and/or lidar data 120. The output of the neural networks 702(1) and/or 702(2) could be vector(s) corresponding to portions of image data 118 and/or lidar data 120. The portions can be tokenized portions of spatial data output by a convolutional neural network, condensed portions of lidar/image data as disclosed herein, time based image/lidar data, or any combination as disclosed herein.

Attention models 704(1)-704(3) may be multi-attention models in the form of a transformer, for example, that may use query, key, and/or value matrices. As disclosed herein, query matrices may be used to determine attention between portions of data within a modality (e.g., image or lidar). As such, the query matrices may act within a corresponding modality pipeline as illustrated.

In some examples, output of the image data 118 sub-pipeline and outputs of the lidar data 120 sub-pipeline may be fed into a fusion component 706. The fusion component 706 may perform feature concatenation, feature fusion, or the like to combine the lidar data and the image data. This combination may be accomplished because image data and lidar data can be represented similarly as spatial data as opposed to audio data. Although FIG. 7 depicts the image data 118 and the lidar data 120 being fed into the fusion component 706, other types of sensor data from different modalities can also be fused. For instance, the audio data 116 and either one of the image data 118 or the lidar data 120 may be fused. However, in some instances it may be optimal to perform fusion on sensor data from certain modalities, such as vision and lidar (e.g., spatial representations of an environment), as opposed to fusing audio (e.g., audio signals associated with the environment) and vision or audio and lidar, and leave the combination of these sensor data modalities to be performed using multi-attention, as shown. This may be because image data 118 and lidar data 120 share more similarities with one another than audio data 116 and image data 118 or lidar data 120.

In some examples, the audio data 116 sub-pipeline and fused outputs from the image data 118 and lidar data 120 pipelines may be fed into the multi-attention model 310. In some examples, the multi-attention model 310 may determine key, query, and value matrices for each of the pipeline feeds (e.g., the processed audio data 116 and the fused image data 118 and lidar data 120). Additionally, the multi-attention model 310 may swap one or more of these key, query, and value matrices (KQV matrices) associated with the audio data 116 with one or more of the KQV matrices associated with the fused image data 118 and lidar data 120. In some examples, outputs of the multi-attention model 310 may be sent to a regression head 708 and/or a classification head 710. Multi-attention model 310 can operate similarly to multi-attention model 310 in that query matrices can be exchanged between modalities (e.g., spatial modalities such as image and lidar and non-spatial modalities such as audio). As disclosed herein, the data-processing pipeline 700 can be trained end-to-end enabling query matrices exchanged between modalities to correspond to specific classifications and/or geometric data (via classification head 710 and regression head 708 respectively). Classification head 710 may output a classification label with an optional confidence value corresponding to label. In examples, multiple classification labels may be output optionally with corresponding confidence values. Regression head 708 may output geometric data in the form of a position, bounding box, velocity, yaw, acceleration, extents, or the like.

Example Clauses

A. A system comprising: one or more processors; and one or more non-transitory computer-readable media storing instructions that, when executed, cause the system to perform operations comprising: receiving first sensor data generated by a first modality of sensor of a vehicle, the first modality being audio: receiving second sensor data generated by a second modality of sensor of the vehicle, the second modality being vision, lidar, or radar; inputting the first sensor data and the second sensor data into a machine-learned transformer model; determining, by the machine-learned transformer model, a first key vector, a first query vector, and a first value vector for the first sensor data; determining, by the machine-learned model, a second key vector, a second query vector, and a second value vector for the second sensor data; determining, by the machine-learned transformer model, a first attention vector based on the first query vector, the second value vector, and the second key vector; determining, by the machine-learned transformer model, a second attention vector based on the second query vector, the first value vector, and the first key vector; and determining, by the machine-learned model and based at least in part on the first attention vector and the second attention vector, at least one of a location or a classification of an object in an environment of the vehicle.

B. The system as recited in paragraph A, wherein the second sensor data includes sensor data generated by two or more sensors of the second modality of sensor, the sensor data generated by the two or more sensors being combined prior to being input into the machine-learned model.

C. The system as recited in any one of paragraphs A-B, wherein the operations further comprise: determining portions of the first sensor data and the second sensor data wherein the first query vector corresponds to weightings of portions of the first sensor data to determine self-attention for the first sensor data; and wherein the second query vector corresponds to weightings of portions of the second sensor data to determine self-attention for the second sensor data.

D. The system as recited in any one of paragraphs A-C, wherein the second sensor data include two or more modalities of sensor data of lidar, vision, or radar data and the operations further comprise: fusing the two or more modalities of sensor data prior to the determining, by the machine-learned model, a second key vector, a second query vector, and a second value vector for the second sensor data.

E. A method comprising: receiving audio data generated by an audio sensor modality: receiving spatial data generated by a spatial sensor modality: inputting the audio data and the spatial data into a machine-learned model: applying, by the machine-learned model, a weighting attention vector corresponding to portions of the spatial data to data corresponding to portions of the audio data: generating, based at least in part on applying the weighting attention vector to the data corresponding to the portions of the audio data, an intermediate value; and determining, by the machine-learned model and based at least in part on the intermediate value, a location or classification of an object in an environment of the vehicle.

F. The method as recited in paragraph E, wherein the different spatial modality is at least one of: vision: lidar: radar; or infrared.

G. The method as recited in any one of paragraphs E-F, wherein the machine-learned model comprises a transformer and the intermediate value is generated based at least in part on a key vector, or a value vector corresponding to the spatial data.

H. The method as recited in any one of paragraphs E-G, wherein the portions of the spatial data are equal in size.

I. The method as recited in any one of paragraphs E-H, wherein the portions of the spatial data are tokenized features of portions of the spatial data.

J. The method as recited in any one of paragraphs E-I, wherein the portions of the spatial data are down sampled portions from data generated by the spatial sensor.

K. The method as recited in any one of paragraphs E-J, wherein the intermediate value is a first intermediate value and the weighting attention vector is a first weighting attention vector and the method further comprises: applying, by the machine-learned model, a second weighting attention vector corresponding to portions of the audio data to portions of the video data: generating, based at least in part on applying the second weighting attention vector to the portions of the video data, a second intermediate value; and wherein the determining the location or classification of the object is based at least in part on the second intermediate value.

L. The method as recited in any one of paragraphs E-K, further comprising controlling operation of the vehicle based at least in part on the location of the object.

M. The method as recited in any one of paragraphs E-L, wherein the first sensor data is audio data received from an array of multiple microphones of the vehicle.

N. The method as recited in any one of paragraphs E-M, wherein the location of the object is a predicted location of the object, and wherein the machine-learned model is trained end-to-end based at least in part on: determining an actual location of the object: determining that a difference between the actual location and the predicted location meets or exceeds a threshold difference; and altering a parameter of the machine-learned model to reduce the difference below the threshold difference and obtain the end-to-end trained machine-learned model that is configured to determine the actual location of the object.

O. The method as recited in any one of paragraphs E-N, wherein the machine-learned model further comprises a self-attention component and wherein the data corresponding to portions of the audio data is generated by the self-attention component.

P. One or more non-transitory computer-readable media storing instructions that, when executed, cause one or more processors to perform operations comprising: receiving audio data generated by an audio sensor modality; receiving spatial data generated by a spatial sensor modality; inputting the audio data and the spatial data into a machine-learned model; applying, by the machine-learned model, a weighting attention vector corresponding to portions of the spatial data to data corresponding to portions of the audio data; generating, based at least in part on applying the weighting attention vector to the data corresponding to the portions of the audio data, an intermediate value; and determining, by the machine-learned model and based at least in part on the intermediate value, a location or classification of an object in an environment of the vehicle.

Q. The one or more non-transitory computer-readable media as recited in paragraph P, wherein the different spatial modality is at least one of: vision; lidar; radar; or infrared.

R. The one or more non-transitory computer-readable media as recited in any one of paragraphs P-Q, wherein the machine-learned model comprises a transformer and the intermediate value is generated based at least in part on a key vector, or a value vector corresponding to the spatial data.

S. The one or more non-transitory computer-readable media as recited in any one of paragraphs P-R, wherein the portions of the spatial data are equal in size.

T. The one or more non-transitory computer-readable media as recited in any one of paragraphs P-S, wherein the portions of the spatial data are tokenized features of portions of the spatial data.

While the example clauses described above are described with respect to one particular implementation, it should be understood that, in the context of this document, the content of the example clauses can also be implemented via a method, device, system, computer-readable medium, and/or another implementation. Additionally, any of examples A-T may be implemented alone or in combination with any other one or more of the examples A-T.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:
one or more processors; and
one or more non-transitory computer-readable media storing instructions that, when executed, cause the system to perform operations comprising:
receiving first sensor data generated by a first modality of sensor of a vehicle, the first modality being audio;
receiving second sensor data generated by a second modality of sensor of the vehicle, the second modality being vision, lidar, or radar;
inputting the first sensor data and the second sensor data into a machine-learned transformer model;
determining, by the machine-learned transformer model, a first key vector, a first query vector, and a first value vector for the first sensor data;

determining, by the machine-learned transformer model, a second key vector, a second query vector, and a second value vector for the second sensor data;

determining, by the machine-learned transformer model, a first attention vector based on the first query vector, the second value vector, and the second key vector;

determining, by the machine-learned transformer model, a second attention vector based on the second query vector, the first value vector, and the first key vector; and determining, by the machine-learned transformer model and based at least in part on the first attention vector and the second attention vector, at least one of a location or a classification of an object in an environment of the vehicle, wherein the second sensor data includes sensor data generated by two or more sensors of the second modality of sensor, the sensor data generated by the two or more sensors being combined prior to being input into the machine-learned transformer model.

2. The system of claim 1, wherein the operations further comprise:

determining portions of the first sensor data and the second sensor data wherein the first query vector corresponds to weightings of portions of the first sensor data to determine self-attention for the first sensor data; and wherein the second query vector corresponds to weightings of portions of the second sensor data to determine self-attention for the second sensor data.

3. The system of claim 1, wherein the second sensor data include two or more modalities of sensor data of lidar, vision, or radar data and the operations further comprise fusing the two or more modalities of sensor data prior to the determining, by the machine-learned transformer model, the second key vector, the second query vector, and the second value vector for the second sensor data.

4. A method comprising:

receiving audio data generated by an audio sensor modality;

receiving spatial data generated by a spatial sensor modality;

inputting the audio data and the spatial data into a machine-learned model;

applying, by the machine-learned model, a weighting attention vector corresponding to portions of the spatial data to data corresponding to portions of the audio data;

generating, based at least in part on applying the weighting attention vector to the data corresponding to the portions of the audio data, an intermediate value; and determining, by the machine-learned model and based at least in part on the intermediate value, a location or classification of an object in an environment of a vehicle, wherein the spatial data includes sensor data generated by two or more sensors of the spatial sensor modality, the sensor data generated by the two or more sensors being combined prior to being input into the machine-learned model.

5. The method of claim 4, wherein the spatial sensor modality is at least one of:
vision;
lidar;
radar; or
infrared.

6. The method of claim 4, wherein the machine-learned model comprises a transformer and the intermediate value is generated based at least in part on a key vector, or a value vector corresponding to the spatial data.

7. The method of claim 4, wherein the portions of the spatial data are equal in size.

8. The method of claim 4, wherein the portions of the spatial data are tokenized features of portions of the spatial data.

9. The method of claim 4, wherein the portions of the spatial data are down sampled portions from data generated by the spatial sensor modality.

10. The method of claim 4, wherein the intermediate value is a first intermediate value and the weighting attention vector is a first weighting attention vector and the method further comprises:

applying, by the machine-learned model, a second weighting attention vector corresponding to portions of the audio data to portions of the spatial data;

generating, based at least in part on applying the second weighting attention vector to the portions of the spatial data, a second intermediate value; and wherein the determining the location or classification of the object is based at least in part on the second intermediate value.

11. The method of claim 4, further comprising controlling operation of the vehicle based at least in part on the location of the object.

12. The method of claim 4, wherein the audio data is received from an array of multiple microphones of the vehicle.

13. The method of claim 4, wherein the location of the object is a predicted location of the object, and wherein the machine-learned model is trained end-to-end based at least in part on:

determining an actual location of the object;

determining that a difference between the actual location and the predicted location meets or exceeds a threshold difference; and altering a parameter of the machine-learned model to reduce the difference below the threshold difference and obtain an end-to-end trained machine-learned model that is configured to determine the actual location of the object.

14. The method of claim 4, wherein the machine-learned model further comprises a self-attention component and wherein the data corresponding to portions of the audio data is generated by the self-attention component.

15. One or more non-transitory computer-readable media storing instructions that, when executed, cause one or more processors to perform operations comprising:

receiving audio data generated by an audio sensor modality;

receiving spatial data generated by a spatial sensor modality, wherein the spatial data include two or more modalities of sensor data of lidar, vision, radar data, or infrared;

fusing the two or more modalities of sensor data to obtain fused spatial data;

inputting the audio data and the fused spatial data into a machine-learned model;

applying, by the machine-learned model, a weighting attention vector of the spatial data to data corresponding to portions of the audio data to determine a key vector, a query vector, and a value vector corresponding to the spatial data;

generating, based at least in part on applying the weighting attention vector to the data corresponding to the portions of the audio data, an intermediate value; and determining, by the machine-learned model and based at least in part on the intermediate value, a location or classification of an object in an environment of a vehicle.

16. The one or more non-transitory computer-readable media of claim 15, wherein the machine-learned model comprises a transformer and the intermediate value is generated based at least in part on the key vector, or the value vector corresponding to the spatial data.

17. The one or more non-transitory computer-readable media of claim 15, wherein the portions of the spatial data are equal in size.

18. The one or more non-transitory computer-readable media of claim 15, wherein the portions of the spatial data are tokenized features of portions of the spatial data.

19. The one or more non-transitory computer-readable media of claim 15, wherein the portions of the spatial data are down sampled portions from data generated by the spatial sensor modality.

20. The one or more non-transitory computer-readable media of claim 15, wherein the machine-learned model further comprises a self-attention component and wherein the data corresponding to portions of the audio data is generated by the self-attention component.

* * * * *